O. G. PFEIFFER.
AUTOMATIC REVERSING GEARING.
APPLICATION FILED DEC. 2, 1912.
Reissued Dec. 29, 1914. 13,855.
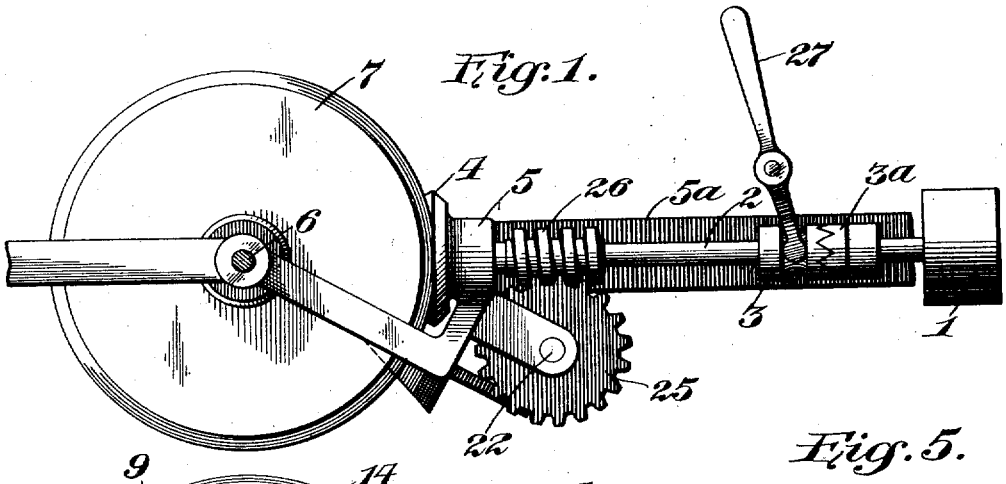
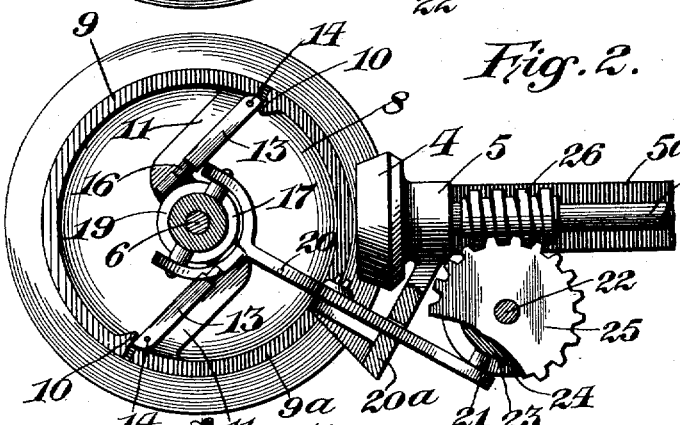
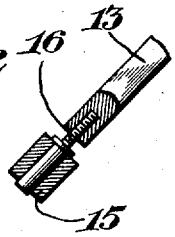
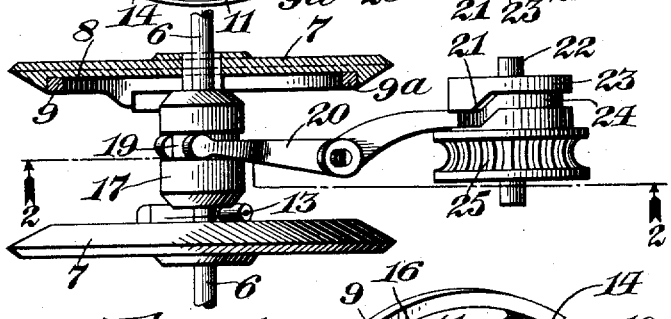
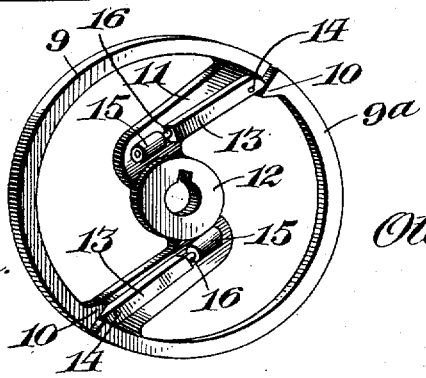
WITNESSES:
Chas. A. Becker.
A. J. Groebl Jr.
INVENTOR:
Otto G. Pfeiffer.
BY John N. Bruning
His ATTORNEY.
THE NORRIS PETERS CO., PHOTO-LITHO., WASHINGTON, D. C.

UNITED STATES PATENT OFFICE.

OTTO G. PFEIFFER, OF SALT LAKE CITY, UTAH, ASSIGNOR, BY MESNE ASSIGNMENTS, TO UTAHNA DEVELOPMENT COMPANY, OF SALT LAKE CITY, UTAH, A CORPORATION OF UTAH.

AUTOMATIC REVERSING-GEARING.

13,855. Specification of Reissued Letters Patent. Reissued Dec. 29, 1914.

Original No. 981,940, dated January 17, 1911, Serial No. 522,857. Application for reissue filed December 2, 1912. Serial No. 734,580.

*To all whom it may concern:*

Be it known that I, OTTO G. PFEIFFER, a citizen of the United States, and residing at Salt Lake City, in the county of Salt Lake and State of Utah, have invented certain new and useful Improvements in Automatic Reversing-Gearing, of which the following is a specification.

My invention relates to gearing for automatically reversing the motion of driven shafts at predetermined intervals, and one of the objects of this invention is to provide a gearing of the character described, particularly adapted to reversing the motion of washing machines, drums and other like apparatus, wherein the direction of motion of a shaft has to be intermittently changed or reversed.

Another object of the invention is to provide a very simple form of automatic intermittent reversing gearing which is certain in its action and which is not likely to get out of order.

For a full understanding of the invention and the merits thereof, and to acquire a knowledge of the details of construction, reference is to be had to the following description and accompanying drawings, in which:

Figure 1 is a side view of my improved gearing; Fig. 2 is a view similar to Fig. 1 but showing parts in section taken on the line 2—2 Fig. 3; Fig. 3 is a top plan view partly in section, parts of the mechanism being omitted to show the clutch shifting means; Fig. 4 is a perspective view of one of the parts hereinafter specifically described; Fig. 5 is a fragmentary section of the inner end of one of the levers 13, and the roller carried thereon.

Corresponding and like parts are referred to in the following description and indicated in all the views of the drawings by the same reference characters.

Referring to these figures, 2 designates a driving shaft formed in two sections and having thereon the clutch members 3, 3ª which intermesh with each other, these members being provided with intermeshing teeth. The driving shaft 2 is driven by suitable motor mechanism, as by the pulley wheel 1. The shaft is supported in a bearing bracket 5 mounted upon the frame or support 5ª and carries upon it the bevel gear or wheel 4.

6 designates a transverse driven shaft mounted in the frame 5ª and having loosely mounted thereon the opposed loose bevel gears or wheels 7 which mesh with the bevel gear or wheel 4. Each of the bevel gears is annularly recessed, as at 8, and located within this recess of each bevel gear is a split clutch ring composed of two sections 9 and 9ª, each of the sections being provided at one end with the head 10, these heads being located diametrically opposite to each other. One end of each of the clutch sections is attached to a spoke or arm 11 projecting from a hub 12, the respective hubs being fast upon the driven shaft 6. Pivotally supported on the outer ends of the spokes 11 are the levers 13, these being pivoted at 14. The inner ends of the levers carry screws 16 supporting the rollers 15. It will be seen that the rollers 15 are opposed to each other on opposite sides of the driven shaft 6 and that when these rollers are forced outward, the levers 13 will be turned and the outer ends thereof forced against the heads 10, thus forcing the clutch sections outward against the rim of the gear 7. Splined upon the driven shaft 6, and located between the two bevel gears 7, is the longitudinally shiftable sleeve 17. The opposite ends of this sleeve are tapering so as to be inserted between and wedge outward the rollers 15 and the levers connected therewith. The sleeve 17 is formed with a groove 19 which is engaged by the forked end of a shifting lever 20 pivoted intermediate its ends on a bracket extending downwardly from the bearing 5 and the frame 5ª. The extremity of the lever has a projecting stud 21. Mounted upon the frame 5ª and extending transversely of the driving shaft is a cam shaft 22 supporting thereon the cylindrical cam 23 having the cam groove 24 formed in its circumference. The cam groove is not cut in a straight line around the cam, but is displaced for a portion of its length to one side of the center of the cam and for another portion of its length to the other side of the center, these two portions being connected by oppositely inclined portions. The stud 21 engages in the cam groove so that as the cam is rotated, the lever 20 will be reciprocated once for each complete revolution of the cam.

Mounted on the cam shaft 22 is the worm wheel 25 which meshes with a worm 26 carried by the driving shaft 2. A shipper lever 27 is provided to throw the clutch member 3 into and out of engagement with the clutch member 3[a]. It will be seen that upon a rotary motion being given to the shaft 2, the gear 4 will be rotated to transmit motion to the bevel gears 7, but since these gears are both loose upon the driven shaft, no motion will be communicated to the driven shaft. By means of the worm 26, motion is given in one direction continuously to the worm wheel 25, and this acts through the cam 23 to oscillate the lever 20 and thus shift the sleeve 17 into engagement first with the clutch on one of the bevel gears 7, and then into engagement with the clutch on the opposed bevel gear. As the clutches are fast on the shaft 6, it follows that the shaft will be given a rotary motion, first in one direction and then in the other. It will be seen that by means of the shipper lever 27, the driving shaft may be disconnected entirely from the motor mechanism, and thus the motion of the driven shaft 6 entirely stopped, but that when the driving shaft is in engagement with the motor mechanism, the gearing connecting the shafts will cause the movement of the driven shaft to be alternately in one direction on the other. By reason of the fact that the clutches used are friction clutches there will be but a minimum of shock communicated to the shafts 2 and 6 upon each reversal of movement. The transfer of the power from one bevel gear to the other is in fact gradual. The mechanism for shifting the clutch sleeve 17 so as to shift the power from one gear wheel to the other is actuated and controlled from the driving shaft, and is therefore actuated upon operation of the driving gearing on said shaft. This shifting mechanism is therefore positive in its action as it is driven from a continuously operating shaft. The shaft 22 is driven from the driving shaft but at a greatly reduced speed.

My invention is exceedingly simple, entirely positive in its movement and thoroughly effective in practice.

Having thus described the invention, what I claim is:—

1. The combination with a driving shaft, a beveled gear wheel thereon and a worm thereon, of a transversely extending driven shaft, oppositely disposed loose gear wheels on the driven shaft engaging with the gear on the driving shaft, an oppositely disposed clutch mechanism on the driven shaft adapted when moved in one direction to engage one of the gear wheels with the driven shaft, and when moved in the opposite direction to disengage it thereform, a shipping lever engaging at one end with the clutch mechanism to shift the clutch mechanism in opposite direction, a gear wheel engaged by the worm on the driving shaft, a cam moving with the last named gear wheel and having a cam track formed in its face, said lever being provided with a pin engaging with said cam track, whereby the lever may be shifted.

2. The combination with a driving shaft and a beveled driving gear wheel thereon, of a driven shaft, oppositely disposed loose gear wheels thereon engaging with the driving gear wheel and each having an annular flange projecting from the inner face thereof, a longitudinally shiftable shipping collar on the driven shaft located between the gear wheels, oppositely disposed hubs on each side of the shipping collar and fast to the driven shaft, arms on each hub projecting in opposite directions, resilient ring sections each attached at one end to the outer end of one of the arms, the free end of each ring section abutting against the fixed end of the other ring section, said sections being surrounded by the said annular flange on the adjacent gear wheel, a lever pivoted to each one of the arms near the extremity thereof, the outer end of each lever engaging the free end of the adjacent ring section, the inner ends of the levers being engageable by the shipping collar when the latter is shifted, a worm gear on the driving shaft, a gear wheel engaged by the worm gear, a cam movable with the gear wheel and having a cam track in its face, and a shipping lever engaging at one end with the cam track and at the other end engaging with the shipping collar.

3. The combination of a driving shaft, a beveled driving gear wheel thereon, a driven shaft, and oppositely disposed gear wheels thereon engaging with the driving gear wheel and each having an annular flange projecting from the face thereof, a longitudinally shiftable shipping collar beveled on its opposite ends and supported on the driven shaft between the said loose gear wheels, oppositely disposed hubs on each side of the shipping collar fixed to the driven shaft, arms on each hub projecting in opposite directions, resilient ring sections each attached at one end to the outer end of one of the arms, the free end of each ring section abutting against the fixed end of the other ring section, said sections fitting within the said annular flange on the corresponding gear wheel, levers each pivoted to one of the arms near the extremity thereof, the outer end of each lever engaging the free end of the adjacent ring section, rollers on the inner ends of the levers adapted to be engaged by the beveled extremity of the shipping collar to be forced outward thereby, a worm gear on the driving shaft, a gear wheel engaged by the worm gear, a cam rotating with the gear wheel and having a cam track on its face, and a shipping lever engaged at one end with the shipping collar and at the other end engaging with said cam track.

4. In mechanism of the class described, a driven shaft, gearing upon said shaft, driving gearing, a worm actuated upon operation of the driving gearing, a gear in mesh with said worm, a cam upon said gear, and cam controlled means operatively connected with the said driven gearing whereby the said driven and driving gearing will coöperate to impart to the driven shaft alternating rotary movement.

5. In a machine of the class described, the combination with a driving shaft and a driven shaft, of a bevel gear on said driving shaft, a pair of bevel gears on said driven shaft meshing with said first bevel gear, a worm driven from said driving shaft independent of said driven shaft, a wheel meshing with said worm, and means actuated by said wheel constructed to clutch said second bevel gears alternately with said driven shaft.

6. In a machine of the class described, the combination with a driving shaft and a driven shaft, of a bevel gear on said driving shaft, a pair of bevel gears on said driven shaft meshing with said first bevel gear, a worm on said driving shaft, a wheel meshing with said worm, a cam connected with said wheel, and means operated from said cam constructed to clutch said second bevel gears alternately with said driven shaft.

7. In a machine of the class described, the combination with a driving shaft and a driven shaft, of gearing connecting said shafts and including a bevel gear on one shaft meshing with a pair of bevel gears on the other shaft, the gear on the driving shaft being of smaller diameter than the meshing gear on the driven shaft, means for clutching said gearing to said driven shaft constructed to cause said driving shaft to impart to said driven shaft alternating rotary movements, and means operated from said driving shaft, but operating at a lower speed, for controlling said clutching means, constructed to cause said driven shaft to move in one direction during a plurality of revolutions of said driving shaft, and then move in the opposite direction during a plurality of revolutions of said driving shaft.

8. In a machine of the class described, the combination with a driving shaft and a driven shaft, of gearing connecting said shafts and including a bevel gear on one shaft meshing with a pair of bevel gears on the other shaft, the gear on the driving shaft being of smaller diameter than the meshing gear on the driven shaft, means for clutching said gearing to said driven shaft constructed to cause said driving shaft to impart to said driven shaft alternating rotary movements, means for shifting said clutching means, and a member driven from said driving shaft, but operating at a lower speed, for operating said shifting means, constructed to cause said driven shaft to move in one direction during a plurality of revolutions of said driving shaft, and then move in the opposite direction during a plurality of revolutions of said driving shaft.

9. In a machine of the class described, the combination with a driving shaft and a driven shaft, of gearing connecting said shafts, means for clutching said gearing to said driven shaft constructed to cause said driving shaft to impart to said driven shaft alternating rotary movements, a cam operated from said driving shaft independent of said driven shaft, and means actuated from said cam for shifting said clutching means.

10. In a machine of the class described, the combination with a driving shaft and a driven shaft, of gearing connecting said shafts, means for clutching said gearing to said driven shaft constructed to cause said driving shaft to impart to said driven shaft alternating rotary movements, and means geared to and operated from said driving shaft independent of said driven shaft for shifting said clutching means.

11. In a machine of the class described, the combination with a driving shaft and a driven shaft, of gearing connecting said shafts, means for clutching said gearing to said driven shaft constructed to cause said driving shaft to impart to said driven shaft alternating rotary movements, an operating shaft driven from said driving shaft independent of said driven shaft and at a lower speed than said driving shaft, and means actuated from said shaft for shifting said clutching means.

12. In a machine of the class described, the combination with a driving shaft and a driven shaft, of gearing connecting said shafts, means for clutching said gearing to said driven shaft constructed to cause said driving shaft to impart to said driven shaft alternating rotary movements, a worm on said driving shaft, a wheel meshing with said worm, and means actuated from said wheel for shifting said clutching means.

13. In a machine of the class described, the combination with a driving shaft and a driven shaft, of gearing connecting said shafts, means for clutching said gearing to said driven shaft constructed to cause said driving shaft to impart to said driven shaft alternating rotary movements, a worm on said driving shaft. a wheel meshing with said worm, a cam connected with said wheel, and means actuated by said cam for shifting said clutching means.

14. In a machine of the class described, the combination with driving and driven shafts, a bevel gear on said driving shaft, a pair of bevel gears on said driven shaft meshing with said first bevel gear, means for clutching said second bevel gears alternately with said driven shaft, and a cylindrical cam driven from said driving shaft and positioned transversely thereof constructed to operate said clutching means.

15. In a machine of the class described, the combination with driving and driven shafts, a bevel gear on said driving shaft, a pair of bevel gears on said driven shaft meshing with said first bevel gear, means for clutching said second bevel gears alternately with said driven shaft, a worm on said driving shaft, a wheel meshing with said worm, a cylindrical cam connected with said wheel, and means actuated from said cam constructed to shift said clutching means.

16. In a machine of the class described, the combination with a driving shaft and a driven shaft, of gearing connecting said shafts, means for clutching said gearing to said driven shaft constructed to automatically cause said driving shaft to impart to said driven shaft alternating rotary movements, means geared to and operated from said driving shaft independent of said driven shaft for automatically shifting said clutching means, and a manually operable clutch constructed to render said automatic mechanism operative and inoperative at will.

17. In a machine of the class described, the combination with a driving shaft and a driven shaft, of a bevel gear on said driving shaft, a pair of bevel gears on said driven shaft meshing with said first bevel gear, friction clutches between said second bevel gears and said driven shaft, means operated from said driving shaft independent of said driven shaft, adapted to shift said clutches, constructed to automatically connect said second bevel gears alternately with said driven shaft, and a manually operable clutch constructed to render said automatic mechanism operative and inoperative at will.

18. In a machine of the class described, the combination with a driving shaft and a driven shaft, of a bevel gear on said driving shaft, a pair of bevel gears on said driven shaft meshing with said first bevel gear, friction clutches between said second bevel gears and said driven shaft, and means operated from said driving shaft independent of said driven shaft, adapted to shift said clutches, constructed to connect said second bevel gears alternately with said driven shaft.

19. In a machine of the class described, the combination with a driving shaft and a driven shaft, of a bevel gear on said driving shaft, a pair of bevel gears on said driven shaft meshing with said first bevel gear, friction clutches between said second bevel gears and said driven shaft, a worm driven from said driving shaft independent of said driven shaft, a worm wheel meshing with said worm, and means operated by said wheel adapted to shift said clutches, constructed to connect said second bevel gears alternately with said driven shaft.

20. In a machine of the class described, the combination with a driving shaft and a driven shaft, of a bevel gear on said driving shaft, a pair of bevel gears on said driven shaft meshing with said first bevel gear, friction clutches between said second bevel gears and said driven shaft, a worm on said driving shaft, a worm wheel meshing with said worm, a cam connected with said wheel, and means operated by said cam adapted to shift said clutches, constructed to connect said second bevel gears alternately with said driven shaft.

In testimony whereof I affix my signature in presence of two witnesses.

OTTO G. PFEIFFER.

Witnesses:
J. H. Bruninga,
O. J. Groebl, Jr.

Copies of this patent may be obtained for five cents each, by addressing the "Commissioner of Patents, Washington, D. C."